United States Patent [19]
Okano et al.

[11] Patent Number: 5,464,582
[45] Date of Patent: Nov. 7, 1995

[54] METHOD FOR MOLDING POLYURETHANE FOAM UNDER SUBATMOSPHERIC PRESSURES

[75] Inventors: Hidenobu Okano; Katsunori Watanabe, both of Inazawa, Japan

[73] Assignee: Toyoda Gosei Co., Ltd., Japan

[21] Appl. No.: 268,661

[22] Filed: Jun. 29, 1994

Related U.S. Application Data

[63] Continuation of Ser. No. 59,739, May 12, 1993, abandoned, which is a continuation of Ser. No. 712,716, Jun. 10, 1991, abandoned.

[30] Foreign Application Priority Data

Jun. 12, 1990 [JP] Japan ................................. 2-153439
Apr. 12, 1991 [JP] Japan ................................. 3-108745

[51] Int. Cl.⁶ ..................................................... B29C 44/06
[52] U.S. Cl. ........................... 264/45.5; 264/50; 264/51; 264/102; 264/DIG. 78
[58] Field of Search ............................ 264/45.5, 50, 51, 264/53, 54, DIG. 78, 102

[56] References Cited

U.S. PATENT DOCUMENTS

| | | | |
|---|---|---|---|
| 3,824,199 | 7/1974 | Nadeao et al. | |
| 3,954,537 | 5/1976 | Alfter et al. | 264/46.8 |
| 4,206,170 | 6/1980 | Sassaman et al. | 264/45.5 |
| 4,285,893 | 8/1981 | Contastin | 264/101 |
| 4,510,106 | 4/1985 | Hirsch | 264/DIG. 9 |
| 4,517,313 | 5/1985 | Nakatani | 264/328.1 |
| 4,572,865 | 2/1986 | Gluck et al. | 264/50 |

(List continued on next page.)

FOREIGN PATENT DOCUMENTS

| | | |
|---|---|---|
| 0006381 | 1/1980 | European Pat. Off. . |
| 0044226 | 1/1982 | European Pat. Off. . |
| 0211495 | 2/1987 | European Pat. Off. . |
| 0353061 | 1/1990 | European Pat. Off. . |
| 451559 | 10/1991 | European Pat. Off. . |
| 0451559 | 10/1991 | European Pat. Off. . |
| 0461522 | 12/1991 | European Pat. Off. . |
| 1575243 | 7/1969 | France . |
| 2196366 | 3/1974 | France . |
| 2634157 | 1/1990 | France . |
| 1813298 | 6/1970 | Germany . |
| 2212609 | 10/1973 | Germany . |
| 2366184 | 6/1979 | Germany . |
| 3310677 | 3/1984 | Germany . |
| 4115456 | 11/1992 | Germany . |
| 55-063238 | 5/1980 | Japan . |
| 55-063237 | 5/1980 | Japan . |
| 56-111648 | 9/1981 | Japan . |
| 64-005528 | 1/1982 | Japan . |
| 62-164709 | 7/1987 | Japan . |
| 63-268624 | 11/1988 | Japan . |
| 2092509 | 8/1982 | United Kingdom . |

OTHER PUBLICATIONS

Patent Abstracts of Japan, vol. 88, No. 1007 (M750) (1988).
U.S. Application of Maguchi, Appln. No. 07/946,077.
Patent Abstracts of Japan, vol. 5, No. 190 (M–100) (1981).
Patent Abstracts of Japan, vol. 8, No. 057 (M–283) (1984).
Patent Abstracts of Japan, vol. 4, No. 105 (M–023) (1980).

*Primary Examiner*—Allan R. Kuhns
*Attorney, Agent, or Firm*—Cushman, Darby & Cushman

[57] ABSTRACT

A method and apparatus for producing a molded polyurethane foam without using low-boiling solvents such as Fleon and methylene chloride which present problems when used as a blowing agent. The polyurethane foam has the same good appearance and soft feeling as that produced with low-boiling solvents. A polyurethane foam is produced by injecting a polyurethane material into an evacuated cavity and permitting it to expand so that it flows and fills the cavity, said polyurethane material being composed of 100 parts by weight of polyol component and 0.1–0.6 part by weight of water as a blowing agent. The cavity pressure may be maintained high spontaneously or low while the polyurethane material is flowing in the cavity. When the polyurethane material has reached the final fill position in the cavity, the fore-end of the polyurethane material is discharged from the cavity.

10 Claims, 13 Drawing Sheets

U.S. PATENT DOCUMENTS

| | | | |
|---|---|---|---|
| 4,576,970 | 3/1986 | Ganster . | |
| 4,579,700 | 4/1986 | Cavender | 264/46.4 |
| 4,909,972 | 3/1990 | Britz | 264/45.5 |
| 4,916,168 | 4/1990 | Pham et al. | 521/172 |
| 4,988,271 | 1/1991 | Kumasaka et al. | 425/150 |
| 5,100,926 | 3/1992 | Kondo . | |
| 5,132,329 | 7/1992 | Lynch . | |
| 5,166,183 | 11/1992 | Franyutti . | |

METHOD FOR MOLDING POLYURETHANE FOAM UNDER SUBATMOSPHERIC PRESSURES

This is a continuation application Ser. No. 08/059,739, filed on May 12, 1993, which has now been abandoned, which was a continuation of Ser. No. 07/712,716 filed Jun. 10, 1991, now abandoned.

BACKGROUND OF THE INVENTION

1. Field of the Invention

The present invention relates to a method and apparatus for molding a polyurethane foam. The method and apparatus are suitable for reactive injection molding (RIM for short) of polyurethane foams in order to form articles such as automotive steering wheel, steering wheel pad, instrument panel, console box lid, glove box lid, headrest, armrest, and air spoiler.

2. Description of the Prior Art

Polyurethane foams are usually produced by injecting a liquid polyurethane material composed of a polyol component and, isocyanate component, and a blowing agent, into the mold cavity, permitting the polyurethane material to expand, thereby permitting it to flow and fill the mold cavity, and removing the polyurethane foam from the mold after curing. Among the known blowing agents are fluorochlorohydrocarbons (such as "Freon", a trade name of DuPont), methylene chloride, and water. An adequate blowing agent is selected according to the use and type of the polyurethane foam to be produced. Freon and methylene chloride (which are low-boiling solvents) expand the polyurethane material when it they are vaporized by heat generated by the reaction of the polyol and isocyanate components. Watch water expands the polyurethane material by evolving carbon dioxide gas upon reaction with the isocyanate component.

Heretofore, low-boiling solvents (such as freon and methylene chloride) have been the only blowing agent that can be used for the molding of polyurethane foams to form articles such as automotive steering wheels and steering wheel pads, which are composed of a surface skin layer of high density (without expansion or with a low expansion ratio) and an internal core of low density (with a high expansion ratio). There are two reasons for this.

(1) Low-boiling solvents (such as Freon and methylene chloride) permit one to control the amount of foaming due to vaporization by the use of a temperature gradient and a pressure gradient in the mold cavity. This produces the desired skin layer and the core part with ease. Thus, the resulting polyurethane foam has a good appearance and soft feel.

(2) Water has several disadvantages as a blowing agent. When used in a small amount (say, 0.1–1.0 part by weight for 100 parts by weight of polyol component), water produces only a small amount of carbon dioxide gas, giving rise to a larger having a high-density core. This necessitates using a larger amount of polyurethane material than necessary. Conversely, when used in a large amount (say, 1.0–2.0 parts by weight for 100 parts by weight of polyol component), water produces a sufficient amount of carbon dioxide gas, giving rise to a foam having a low-density core as well as a highly expanded skin layer which looks poor. Moreover, the carbon dioxide gas forms a large number of urea bonds which make the core hard and brittle and hence make the foam, as a whole feel rigid. This problem associated with rigid feeling can be solved by selecting a proper composition for the polyol component and isocyanate component. However, this is not practicable because of the high material cost.

As mentioned above, low-boiling solvents (such as freon and methylene chloride) have many advantages and are used as an essential blowing agents for the molding of polyurethane foams composed of a skin layer and a core part.

Despite their advantages, freon and methylene chloride have recently met with a worldwide campaign against their use. It is said that freon, once released, diffuses into the atmosphere and destroys the strataspheric ozone layer resulting in an increase of ultraviolet rays reaching the earth's surface. Methylene chloride is considered to be toxic and carcinogenic.

SUMMARY OF THE INVENTION

It is an object of the present invention to provide a new method and apparatus for producing a polyurethane foam without resorting to the of use of low-boiling solvents (such as freon and methylene chloride) which provide the above-mentioned problems when used as a blowing agent. The polyurethane foam has a good appearance and soft feel as if it were produced using a low-boiling solvent as a blowing agent.

Japanese Patent Laid-open Nos. 63237/1980 and 63238/1980 disclose a method of producing a polyurethane foam which comprises evacuating the mold through a small groove formed in the mold which is connected to a vacuum pump. This method is intended to produce a uniform rigid polyurethane foam free of voids and blisters in the surface layer, but is not intended to eliminate the use of freon (as in the present invention). Moreover, they do not specify any substance as the blowing agent. It is only possible to speculate that low-boiling solvents such as freon are used as the blowing agent. In addition, they do not disclose the amount of the blowing agent (which is an important factor in the present invention), nor do they suggest the relationship between the atmospheric pressure and the blowing agent. In other words, these Japanese Patents do not disclose or suggest the object, constitution, and effect of the present invention.

DESCRIPTION OF THE PREFERRED EMBODIMENTS

Figure 1:
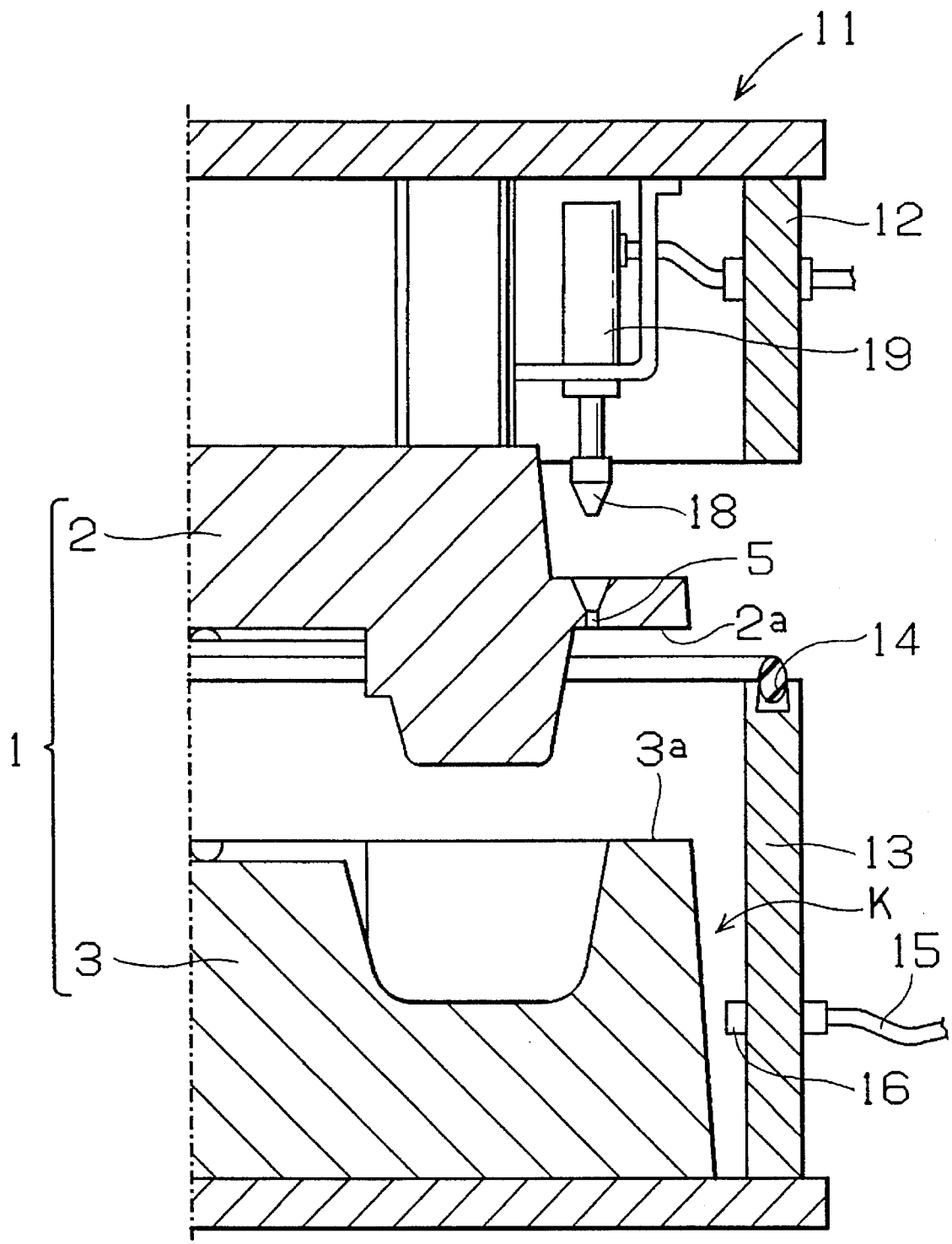
FIG. 1 is a sectional view showing (in half) the vacuum box and mold (in the open state) which are used in the first example of the invention.

The object of the present invention is achieved by the method for molding a polyurethane foam as defined in the first to fourth embodiments and the apparatus for molding a polyurethane foam as defined in the fifth to ninth embodiments.

The first embodiment of the present invention is a method for molding a polyurethane foam which comprises lowering the atmospheric pressure in the mold cavity, injecting a polyurethane material into the cavity, and permitting the polyurethane material to expand so that it flows and fills the cavity, said polyurethane material being composed of 100 parts by weight of a polyol component and 0.1–0.6 parts by weight of water as a blowing agent. According to the present invention, the amount of water is limited to 0.1–0.6 parts by weight for the following reasons. When present in an amount less than 0.1 parts by weight, water does not bring about sufficient foaming even though the atmospheric pressure in the cavity is kept low. When present in an amount in excess of 0.6 parts by weight, water gives rise to excess urea bonds which make the foam hard and brittle and also gives rise to large cells in the surface layer of the foam. The atmospheric pressure in the cavity varies depending on the amount of water which is added and the extent of foaming required. It should preferably be lower than 100 mmHg if the amount of water is 0.1 part by weight, and lower than 400 mmHg if the amount of water is 0.6 part by weight.

The second embodiment of the present invention is a method for molding a polyurethane foam as defined above which further comprises the introduction minute air bubbles into the polyurethane material before its injection into the cavity.

The third embodiment of the present invention relates to a method for molding a polyurethane foam which comprises lowering the atmospheric pressure in the mold cavity, injecting a polyurethane material into the cavity, permitting the polyurethane material to expand so that it flows, increasing the atmospheric pressure in the cavity spontaneously as the polyurethane material flows, and, when the flowing polyurethane material has reached the final fill position in the cavity, discharging from the cavity the fore-end of the flow of the polyurethane material which goes beyond the final fill position, said polyurethane material being composed of 100 parts by weight of polyol component and 0.1–0.6 part by weight of water as a blowing agent. The step of "increasing the atmospheric pressure in the cavity spontaneously" may be accomplished by, for example, closing the vent hole formed in the mold or causing the polyurethane material to seal the gap between the mating mold surfaces. The step of "discharging from the cavity the fore-end of the flow of the polyurethane material" may be accomplished by, for example, opening the vent hole formed at the final fill position.

The fourth embodiment of the present invention relates to a method for molding a polyurethane foam which comprises lowering the atmospheric pressure in the mold cavity, injecting a polyurethane material into the cavity, permitting the polyurethane material to expand so that it flows, keeping the atmospheric pressure low in the cavity while the polyurethane material is flowing, and, when the flowing polyurethane material has reached the final fill position in the cavity, discharging from the cavity the fore-end of the flow of the polyurethane material which goes beyond the final fill position, said polyurethane material being composed of 100 parts by weight of polyol component and 0.1–0.6 parts by weight of water as a blowing agent. The step of "keeping the atmospheric pressure low in the cavity" may be accomplished by, for example, opening the vent hole in the mold and continuing evacuation through the vent hole. In this fourth method it is desirable to maintain the atmospheric pressure in the cavity at such a level that it is not excessively low compared with that in the third embodiment. The reason for this is to prevent carbon dioxide gas from expanding excessively to form coarse cells.

The fifth embodiment of the present invention relates to an apparatus for molding a polyurethane foam which comprises a mold having a cavity, a depressurizing unit to lower the atmospheric pressure in the cavity, and a venting mechanism which opens and closes the final fill position of the cavity, exposing the cavity to the depressurizing unit.

The sixth embodiment of the present invention relates to an apparatus for molding a polyurethane foam as noted above wherein the depressurizing unit comprises a vacuum box surrounding the mold, with a space interposed between them, and a vacuum pump connected to the vacuum box.

The seventh embodiment of the present invention relates to an apparatus for molding a polyurethane foam as noted in the fifth embodiment, wherein the depressurizing unit comprises a groove formed in the periphery of the mold cavity which is disposed so as to form a space when the mold is closed, and a vacuum pump connected to the groove.

The eighth embodiment of the present invention is an apparatus for molding a polyurethane foam as noted above, wherein the venting mechanism comprises a vent hole formed at the final fill position of the mold cavity and a hydraulic cylinder provided with a plug to open and close the vent hole.

The ninth embodiment of the present invention is an apparatus for molding a polyurethane foam as which further comprises a control means which closes the vent hole to the final fill position to the depressurizing unit for a prescribed period of time after the injection of the polyurethane material into the cavity, and opens the vent hole to the final fill position to the depressurizing unit after the prescribed period of time has elapsed.

According to the method defined in the first embodiment the present invention, the molding of a polyurethane foam is accomplished by injecting a polyurethane material composed of 100 parts by weight of polyol component and 0.1–0.6 parts by weight of water as a blowing agent into a cavity in which the atmospheric pressure has been decreased. The polyurethane material undergoes the following change which vary from position to position in the cavity.

At the central part, which is away from the molding surface, the polyurethane material sufficiently expands to form a core of low density because of the foaming action and expanding action by water (1) Chemical foaming by the chemical reaction of water The central part of the polyurethane material gets hot (say, 70°–90° C.) due to the reaction between the polyol component and the isocyanate component. This reaction heat, in turn, promotes the reaction between the water and the isocyanate component, evolving carbon dioxide gas; The amount of carbon dioxide gas is not large in this method, because the amount of water is in the range from 0.1–0.6 parts by weight. However, in the present method, the atmospheric pressure in the cavity is lowered, so that the carbon dioxide gas evolved expands according to Boyle-Charles' Law. This gives rise to sufficient foaming in the central part of the polyurethane material. The core part which is thus formed by chemical foaming contains only a small number of urea bonds because of the small amount of water used. Therefore, the core part is neither hard nor rigid. In other words, it gives the same soft feel as a conventional foam produced using a low-boiling solvent such as freon or methylene chloride.

(2) Physical foaming by boiling and evaporation of water

According to the present method, the atmospheric pressure in the cavity is lowered. This results in the depression of the boiling point of water. However the central part of the polyurethane material remains at a high temperature, as mentioned above. If the atmospheric pressure in the cavity is lowered to a great extent or the temperature of the polyurethane material is raised intentionally, it the temperature at the central part of the polyurethane material could be raised to be higher than the boiling point of water. In this case, water boils and evaporates to produce steam which contributes to the foaming of the core part in conjunction with the above-mentioned chemical foaming.

The situation is different in that part of the polyurethane material which comes into contact with the molding surface. The surface layer does not get hotter than the mold temperature (usually 40°–60° C.) because the reaction heat from the polyol component and isocyanate component escapes to the mold. In this situation water barely reacts with the isocyanate component and hence produces very little carbon dioxide gas. This results in the formation of a skin layer with a low extent of foaming. The surface of the skin layer has almost invisible fine cells. In other words, the resulting foam has as good an appearance as the conventional foam produced with a low-boiling solvent such as freon or methylene chloride. There are some instances where it is desirable that a polyurethane foam for specific uses has a surface layer with a high extent of foaming. This requirement can be met by raising the mold temperature sufficiently high so as to promote the evolution of carbon dioxide gas by the reaction of the isocyanate component with water.

As time goes on, the polyurethane material expands and flows in the cavity, forming the highly expanded core part and the slightly expanded akin layer, until it reaches the final fill position. This forms the polyurethane foam article.

According to the method defined in the second embodiment of the present invention, the molding of a polyurethane foam involves the introduction of minute air bubbles into the polyurethane material prior to its injection into the mold. The minute air bubbles expand in the cavity owing to the heat of the reaction of the polyol component and isocyanate component and hence brings about the foaming of the polyurethane material. This results in a greater extent of foaming than that achieved by the above-mentioned first embodiment.

According to the method defined in the third embodiment of the present invention, the molding of a polyurethane foam involves a spontaneous increase in atmospheric pressure in the cavity which is concomitant with the flow of the polyurethane material. The increased atmospheric pressure prevents the carbon dioxide gas evolved from expanding infinitely, thereby giving rise to coarse cells. This leads to a polyurethane foam having a uniformly expanded core part. In addition, this method is designed to discharge from the cavity the fore-end of the flow of the polyurethane material which goes beyond the final fill position. This helps remove gas which otherwise tends to stay in the fore-end of the flow, and hence prevents defects such as pinholes, voids, and short shot.

According to the method defined in the fourth embodiment of the present invention, the molding of a polyurethane foam is accomplished by keeping a low atmospheric pressure in the cavity while the polyurethane material is flowing. This promotes the expansion of the carbon dioxide gas evolved and hence gives rise to a large amount of foaming. As in the method of the third embodiment, it is possible to prevent defects such as pinholes, voids, and short shot owing to the removal of gas from the fore-end of the flow of the polyurethane material.

The apparatus as defined in the fifth embodiment of the present invention is provided with a depressurizing unit to lower the atmospheric pressure in the cavity during the molding of a polyurethane foam. If the polyurethane material is injected into the cavity, with the final fill position in the cavity closed by the venting mechanism, the molding of a polyurethane foam is accomplished according to the method defined in the third embodiment. When the final fill position is left open, the molding of a polyurethane foam is accomplished according to the method defined in the fourth embodiment.

The apparatus as defined in the sixth embodiment of the present invention is constructed such that the vacuum box of the depressurizing unit surrounds the mold, with a space interposed between them. The vacuum box is evacuated by a vacuum pump so that air escapes from the cavity through the gap (air vent land) between the mating mold surfaces or through the venting mechanism. The vacuum box surrounding the mold prevents air from entering the evacuated mold cavity. The space between the vacuum box and the mold functions as a buffer for evacuation.

The apparatus as defined in the seventh embodiment of the present invention is constructed such that the periphery of the mold cavity has a groove which functions as the space when the mold is closed. It obviates the vacuum box in the apparatus as defined in the sixth embodiment and hence contributes to the reduction of the size of the molding apparatus. Moreover, it also leads to the reduction of the volume of the space, which reduces the time required for evacuation.

The apparatus as defined in the eighth embodiment of the present invention has a venting mechanism which has a simple structure which operates reliably.

The apparatus as defined in the ninth embodiment of the present invention includes a control means. This controls the venting mechanism so as to close the final fill position to the depressurizing unit for a prescribed period of time after the injection of the polyurethane material into the cavity. This arrangement permits the atmospheric pressure in the cavity to be kept high while the polyurethane material flows. The control means controls the venting mechanism and opens the final fill position to the depressurizing unit after the lapse of the prescribed period of time. This arrangement discharges the fore-end of the flow of the polyurethane material which from the cavity goes beyond the final fill position. Therefore, this apparatus helps practice the method as defined in the third embodiment.

EXAMPLES

Example 1

Figure 2:
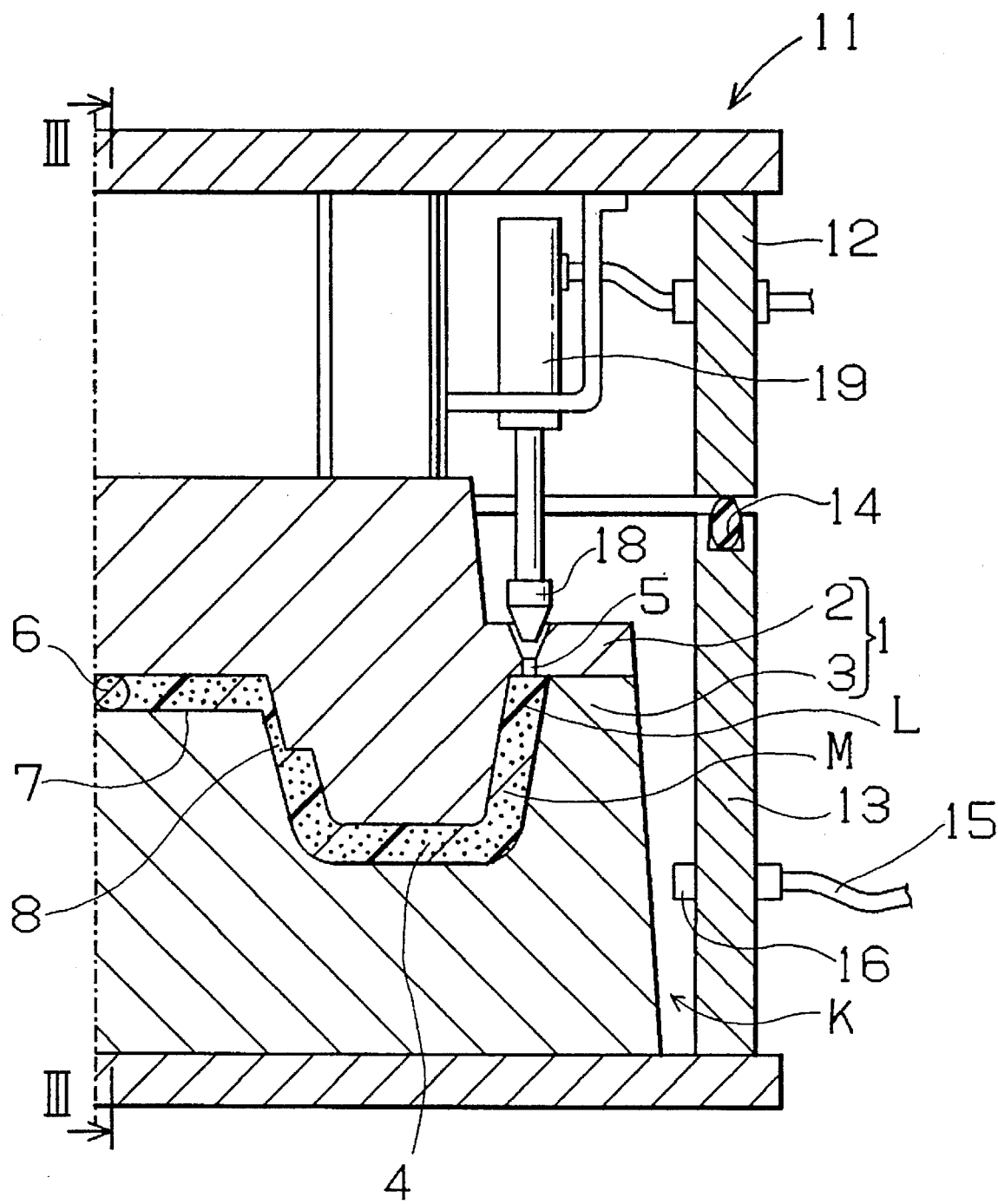
FIG. 2 is a sectional view showing (in half) the vacuum box and mold (in the closed state) shown in FIG. 1.
Figure 3:
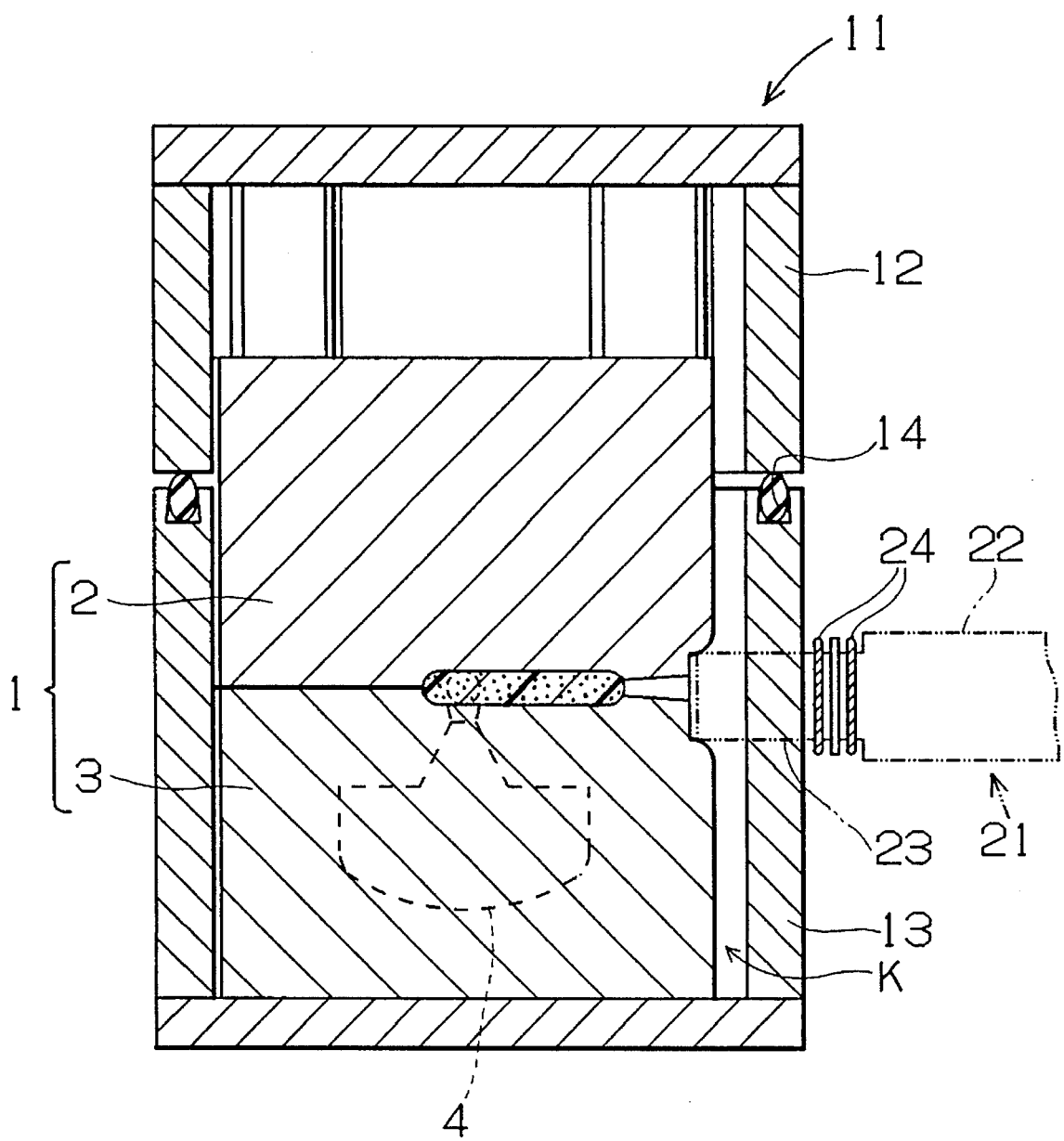
FIG. 3 is a sectional view taken in the direction of the arrows along the line III—III in FIG. 2.

The first example of the present invention describes in the molding of a steering wheel pad will be described with reference to FIGS. 1 to 3 which show the molding apparatus used in the example. The molding apparatus is constructed of a mold 1 (composed of 2 split molds), a vacuum box 11 which encloses the mold 1, forming a space K between the vacuum box and the mold, a mechanism 21 attached to the vacuum box 11 which injects the polyurethane material into the cavity 4 of the mold 1, and a vacuum pump (not shown) to evacuate the vacuum box 11. Each part is detailed in the following.

The mold 1 has a vent hole 5 at the final fill position L of the polyurethane material in the cavity 4. The mold 1 is made up of 2 split molds, that is, a stationary mold 2 and a movable mold 3. The split molds form the cavity 4, when closed. The split molds also have grooves on their mating mold surfaces 2a and 3a which form, when closed, a sprue 6, runner 7, and gate 8 through which the polyurethane material flows. When the split molds are closed, the mating mold surfaces 2a and 3a form air vent lands with a clearance of 0.03–0.06 mm (which is unavoidable due to the limited machining precision) along the entire periphery of the cavity 4. The air vent lands permit degassing (mentioned later).

The vent hole 5 has a diameter of 1–10 mm. With a diameter smaller than 1 mm, the vent hole 5 does not permit complete degassing (because the final fill position of the polyurethane material fluctuates). With a diameter larger than 10 mm, the vent hole 5 leaves an unsightly mark after demolding. The mold 1 may be an inexpensive aluminum mold or electroformed mold because it does not need high pressure resistance. (The foaming pressure is usually 50–500 kPa.)

The vacuum box 11 is large enough to enclose the mold 1, forming the space K between the mold 1 and the vacuum box 11. The vacuum box 11 is made up of an upper casing 12 to which is fixed the stationary mold 2, and a lower casing 13 to which is fixed the movable mold 3. To the periphery of the lower casing 13 is fitted a sealing member (O-ring) 14 to facilitate the tight closing of the vacuum box 11. The lower casing 13 is provided with a suction port 16 which is connected to a vacuum pump (not shown) through a suction hose 15. The upper casing 12 is provided with an air cylinder 19 to vertically actuate a plug 18 which opens and closes the vent hole 5. (This is not mandatory.)

The injecting mechanism 21 is made up of a mixing head 22 and a injection nozzle 23. The injection nozzle 23 is connected to the sprue 6 of the mold 1 through an O-rings 24. The mixing head 22 is connected to a polyol tank and an isocyanate tank (both not shown) through high-pressure pumps and circulating pipes, so that the polyol component and isocyanate component are vigorously mixed at the time of injection and are recycled to their respective tanks when injection is not performed. The polyurethane material used in this example is composed of 100 parts by weight polyol component, 0.1–0.6 parts by weight of water, and an isocyanate component in an amount corresponding to an index of 110.

The above-mentioned apparatus (made up of the mold 1 and the vacuum box 11) is used in the following manner to carry out the foaming operation.

(1) First, the mold 1 is closed by mating the stationary mold 2 and the movable mold 3 with each other. Before complete mold closing or after complete mold closing (which forms the cavity 4), the vacuum box 11 is tightly closed and evacuated until the pressure inside and outside the cavity 4 decreases to a desired level. When the vacuum box 11 is evacuated, the mold 1 therein is completely closed. In the case where the mold 1 is completely closed before the vacuum box 11 is closed, the cavity 4 of the mold 1 is evacuated through the gap between the mating mold surfaces 2a and 3a as the vacuum box 11 is evacuated.

The closing of the vacuum box 11 may be accomplished by raising the lower casing 13 of the vacuum box 11 by means of a hydraulic cylinder ram (not shown) until it comes into contact with the upper casing 12. Tight closing is ensured by the sealing member 14 fitted to the periphery of the lower casing 13. It is possible to close (and open) the vacuum box 11 and the mold 1 simultaneously or separately. A single hydraulic unit suffices for the former case (which is economical), but two hydraulic units are necessary for the latter case.

Then, the vacuum pump (not shown) is set in motion to evacuate the vacuum box 11 through the suction port 16. As the vacuum box 11 is evacuated, the cavity 4 is also evacuated because it communicates with the vacuum box 11 through the sprue 6, the vent hole 5, and the gap between mating mold surfaces 2a and 3a. Evacuation is performed until a vacuum of about 10 mmHg (absolute) is attained.

(2) With the vacuum box 11 kept at a reduced pressure, a polyurethane material M is injected into the cavity 4 of the closed mold i through the mixing head 22 and the injection nozzle 23. This injection is performed while keeping the mold temperature of the mold 1 lower than usual or keeping the viscosity of the polyurethane material M higher than usual so that foaming does not take place on the surface of the polyurethane material M immediately after its injection into the cavity 4. (This differentiates the molding method of the present invention from the ordinary molding method which consists of injecting a nonfoamable thermoplastic resin into an evacuated cavity or injecting a foamable material into a cavity at normal pressure.)

As soon as the polyurethane material M is injected into the cavity 4, reactions take place between the polyol component and the isocyanate component, raising the temperature at the center of the polyurethane material M due to reaction heat. Reactions also take place between the water and the isocyanate component, producing carbon dioxide gas. The amount of carbon dioxide gas is not so large because the amount of water is limited to 0.1–0.6 parts by weight; however, the carbon dioxide gas greatly expands according to Boyle-Charles' law, because cavity 4 is under reduced pressure. This results in a highly expanded core part in the polyurethane material M. This core part is not hard nor rigid because it contains only a small number of urea bonds proportional to the limited amount of water. Therefore, the steering wheel pad obtained in this manner has the same soft feel as the conventional one produced with a low-boiling solvent such as freon.

On the surface of the polyurethane material M, the reaction of the isocyanate component with water hardly takes place and very little carbon dioxide gas is evolved, because the reaction heat of the polyol component and isocyanate component escapes to the mold. As the result, the surface part of a polyurethane material forms the skin layer which has almost invisible small foams. Therefore, the steering wheel pad obtained in this manner has the same good appearance as the conventional one produced with a low-boiling solvent such as Fleon.

Evacuating the cavity 4 produces an additional effect of permitting the polyurethane material M to completely fill the cavity 4 even though the cavity 4 has an undercut or branch, because there is no air in the cavity 4 which hinders the free flow of the polyurethane material. A small amount of excess gas evolved by the polyurethane material smoothly escapes through the gap between the mating mold surfaces 2a and 3a as the polyurethane material flows in the cavity. This makes it unnecessary to inject an amount of the polyurethane material in large excess of the theoretical amount in order to avoid incomplete venting and incomplete mold filling. It is only necessary to inject the an amount of the polyurethane material M which is slightly more than the theoretical amount calculated from the intended expansion ratio. Very little of the material flows out of the mold 1 during the molding operation. This reduces the material loss and obviates the deflashing operation, which leads to an increased productivity.

It is desirable (although not mandatory) that the vent hole 5 of the mold 1 be kept closed by the plug 18 until the polyurethane material M is about to fill the cavity 4. This prevents the polyurethane material from escaping from the vent hole 5 and contributes to the uniform expansion (and hence the production of a foam of uniform quality). Immediately before the complete filling of the cavity with the polyurethane material (which usually takes about 10–20 seconds after injection of the material into the cavity), the air cylinder 19 is actuated to raise the plug 18 and open the air vent holes 5 for the degassing of the polyurethane material M at its final flow position.

(3) After the polyurethane material has cured, the mold 1 and vacuum box 11 are opened and the steering wheel pad is demolded to complete one cycle of the molding operation.

Example 2

The second example of the present invention which discloses in the molding of a steering wheel will be described with reference to FIGS. 4 to 13 which show molding apparatus used in the example. The molding apparatus has many parts common to that in the first example. Basically, it is constructed of a mold 1, a vacuum box 11, a material injecting mechanism 21, and a vacuum pump (not shown). Those parts common to that in the first example are indicated by like reference numbers in FIGS. 4 to 7, and their description is not repeated except for the supplementary description that follows.

The mold 1 is designed to form the covering 43 on the ring of the steering wheel 41. It is made up of an upper stationary mold 2 and a lower movable mold 3. They have a groove 4a so that they form a circular cavity 4 when they are closed. At the center of the cross section of the cavity is placed the ring of the steering wheel core 42. To this groove 4a is connected a gate 8 (as shown at the left side in FIG. 4). The polyurethane material M is injected into the cavity 4 through the gate 8. In the cavity 4 the polyurethane material M splits into two flows which join at the final fill position L (at the right side in FIG. 6) after filling the cavity 4. At the final fill position L is a venting mechanism which is made up of a vent hole 5 (which leads to the space K in the vacuum box 11) and an air cylinder 19 provided with a plug 18 to open and close the vent hole 5. The rod of the air cylinder 19 passes through a plate 20 which prevents the excess part 46 of the polyurethane material M (mentioned later) from blowing off upward. The venting mechanism is provided with a control means (not shown) which keeps the vent hole 5 closed for a prescribed period of time in which the polyurethane material M injected into the cavity 4 fills the cavity 4, and opens the vent hole 5 after the lapse of a prescribed period of time.

Inside the groove 4a of the stationary mold 2 and movable mold 3 are fitting units 31 for the positioning of the molds 2 and 3 (when closed), and a hole 32 and a pedestal 33 which hold the boss of the steering wheel core 42. The pedestal 33 has an ejector pin 34 to demold the steering wheel 41 after molding. Like the first example, the molds 2 and 3 have the mating mold surfaces 2a and 3a which form a gap of 0.03–0.06 mm when they are closed.

The stationary mold 2 and the upper casing 12 are integrally constructed, and the movable mold 3 and the lower casing 13 are integrally constructed. The lower casing 13 is attached to a hydraulic cylinder ram (not shown) so that it is moved up and down as the mold is closed and opened. At its raised position, the periphery of the lower casing 13 is in contact with the periphery of the upper casing 12. The injecting mechanism 21 is connected to an injection nozzle 23 (which passes through the lower casing 13 and reaches the movable mold 3) tightly by the aid of a sealing member 24 (O-rings), which prevents the leakage of air through the gap between the lower casing 13 and the injection nozzle 23 when the vacuum box 11 is evacuated.

Like the first example, the polyurethane material used in this example is composed of 100 parts by weight polyol component, 0.1–0.6 parts by weight of water, and an isocyanate component in an amount corresponding to an index of 110.

The above-mentioned apparatus is used in the following manner to carry out the foaming operation.

Figure 4:
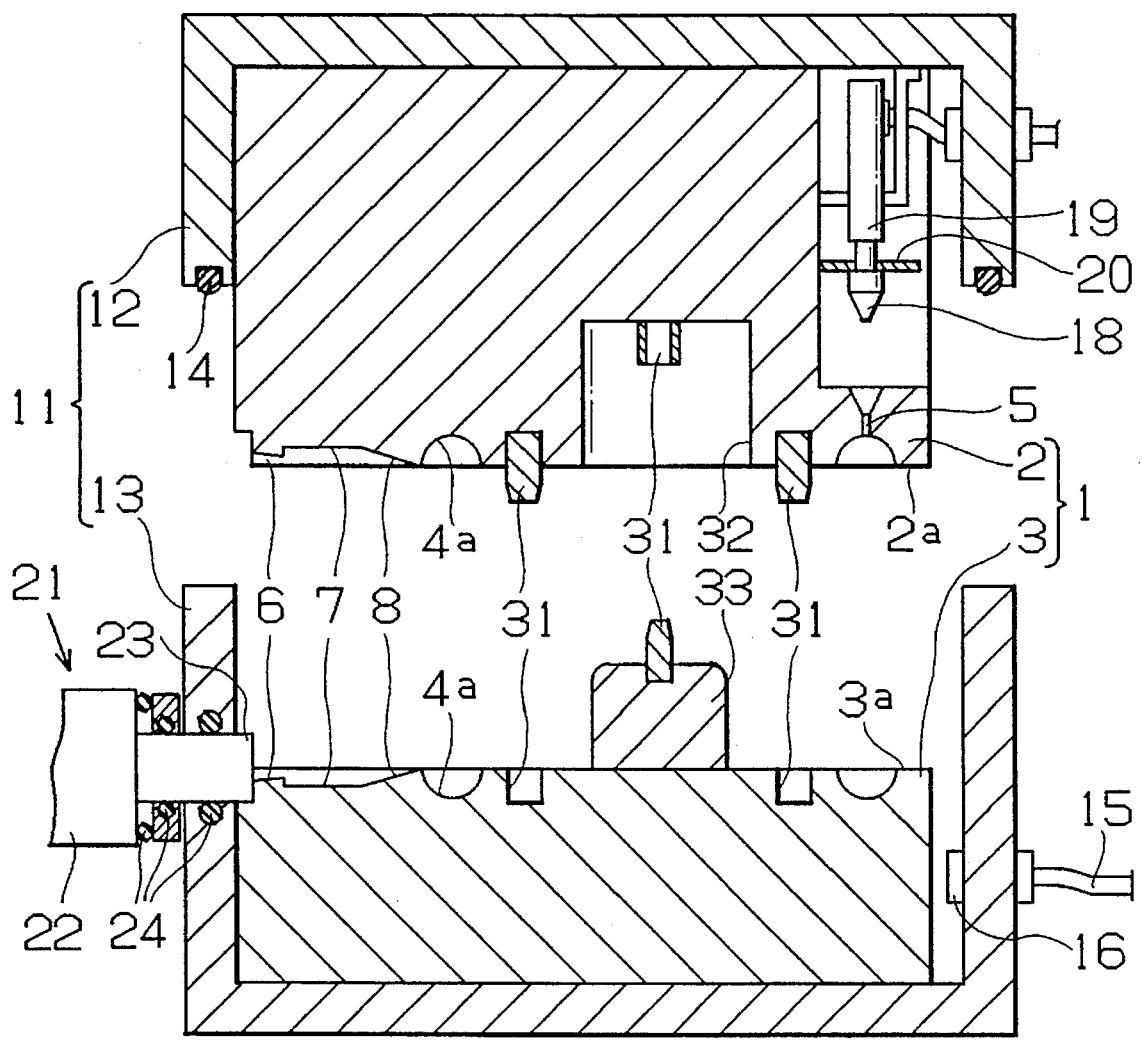
FIG. 4 is a sectional view showing the vacuum box and mold (in the open state) which are used in the second example of the invention.
Figure 5:
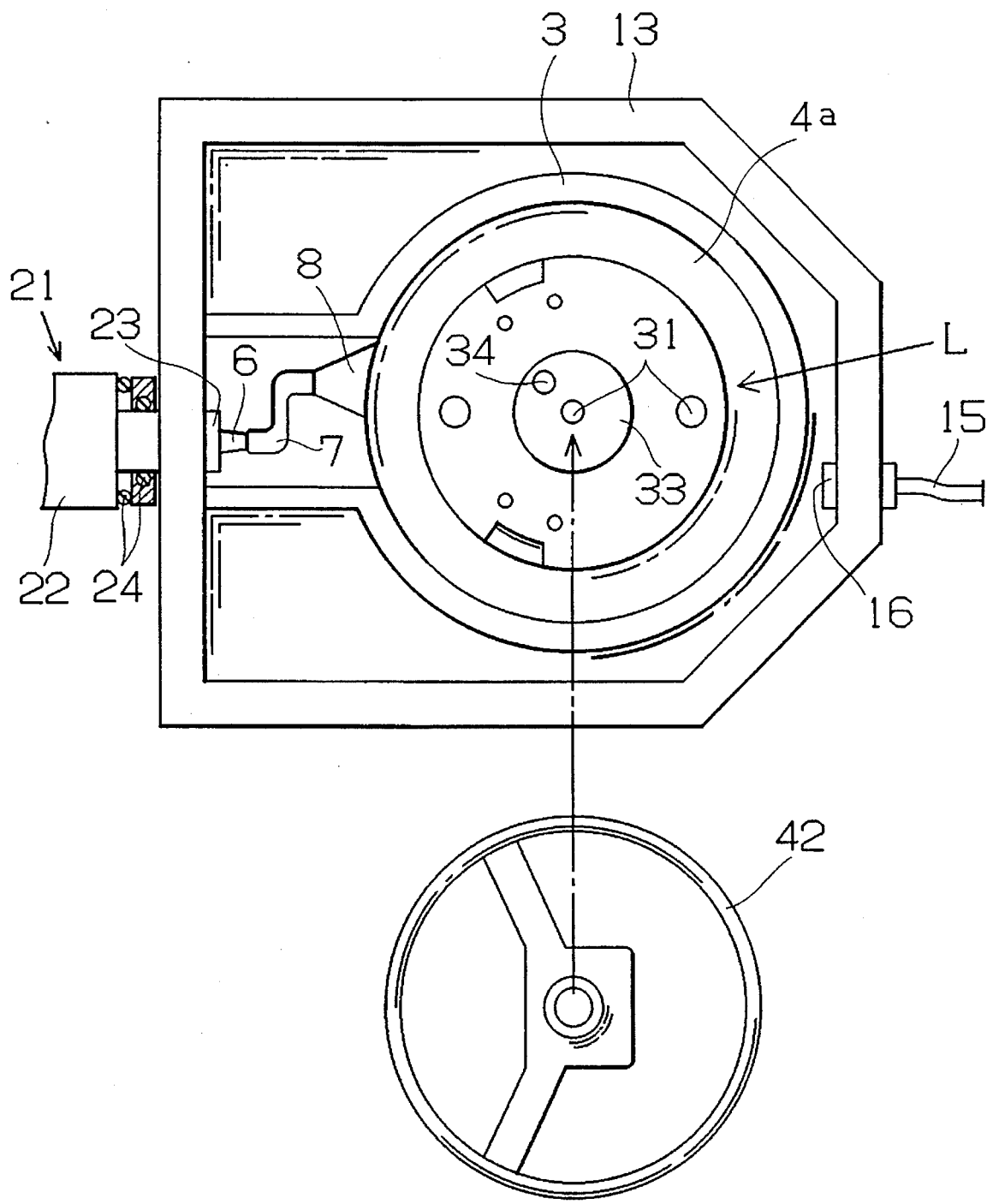
FIG. 5 is a plan view showing the lower case of the vacuum box and the movable half of the mold (in the open state) shown in FIG. 4.

(1) With the stationary mold 2 and movable mold 3 opened as shown in FIG. 4, the steering wheel core 42 is fitted into the movable mold 3 as shown in FIG. 5.

(2) The stationary mold 2 and movable mold 3 are closed to form the cavity 4. At the same time, the lower casing 13 is raised until its periphery comes into contact with the periphery of the upper casing 12, so that the vacuum box 11 is sealed. The closing of the molds and vacuum box is accomplished by raising the lower casing 13 of the vacuum box 11 by a hydraulic cylinder ram (not shown) until the lower casing 13 comes into contact with the upper casing 12.

(3) Then, the vacuum pump (not shown) is set in motion to evacuate the space K in the vacuum box 11 through the suction port 16 until the atmospheric pressure therein is reduced below 500 mmHg, preferably below 300 mmHg. As the vacuum box 11 is evacuated, the cavity 4 of the mold 1 is also evacuated through the gap between mating mold surfaces 2a and 3a (and also the vent hole 5 if it is open). As the result, the space K in the vacuum box 11 and the cavity 4 are evacuated to a similar level.

Figure 6:
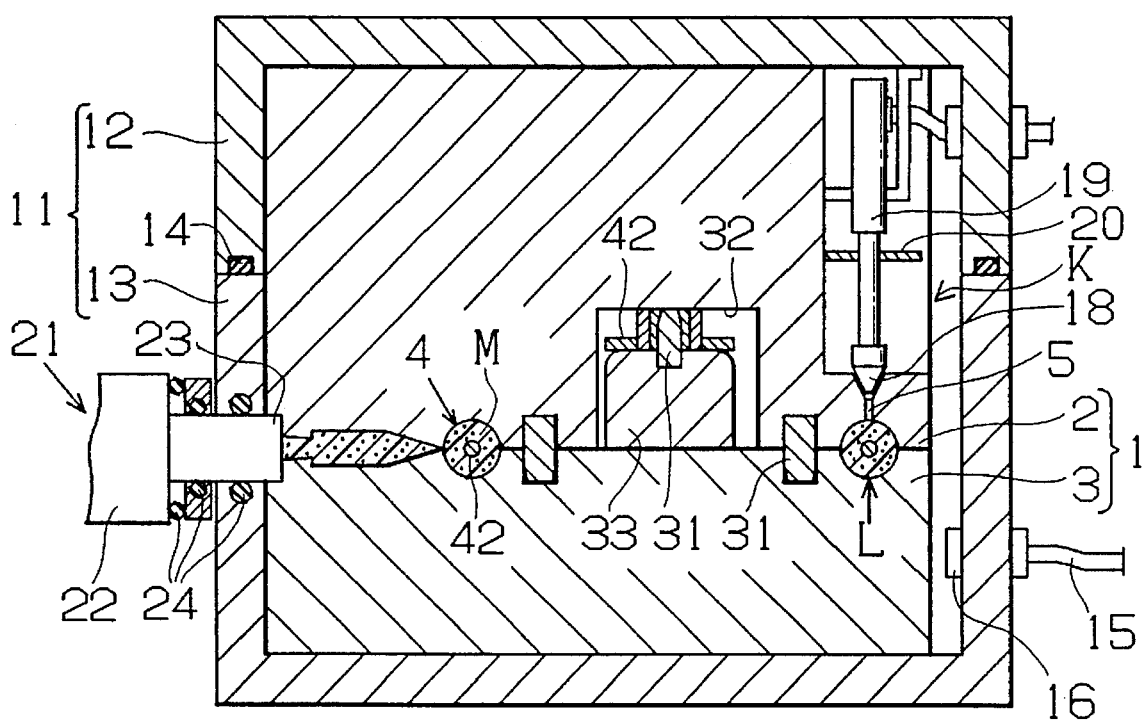
FIG. 6 is a sectional view showing the lower case of the vacuum box and the movable half of the mold (in the closed state for molding operation) shown in FIG. 4.

(4) With the vent hole 5 closed (as shown in FIG. 6), the polyurethane material M is injected into the cavity 4 of the closed mold 1 through the mixing head 22 and injection nozzle 23. The volume of the polyurethane material M to be injected is usually one-fourth to a half of the volume of the cavity. The injection takes 2–4 seconds. It is desirable (although not mandatory) that the polyurethane material M undergo aeration prior to injection into the cavity 4 so that it contains a large number of minute air bubbles which contribute to excellent expansion as explained earlier.

Figure 13:
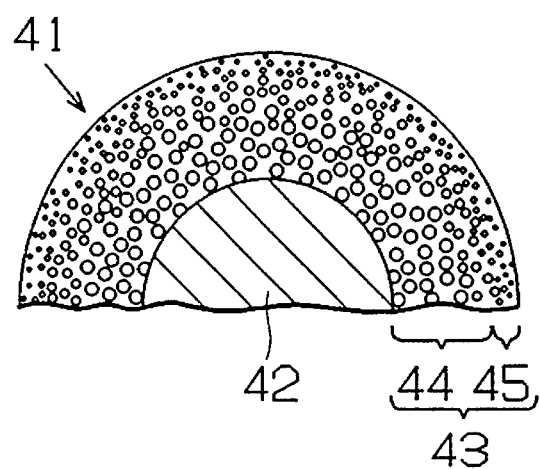
FIG. 13 is a partly enlarged sectional view showing the molded steering wheel.

When injected into the cavity 4, the polyurethane material M expands at its central part, as shown in FIG. 13, due to chemical foaming in the same manner as in the first example. This expansion is responsible for the core 44 having the same soft feeling as that obtained with a low-boiling solvent such as freon in the conventional manner. Moreover, it is possible that the temperature at the central part of the polyurethane material M is higher than the boiling point of water, if the atmospheric pressure in the cavity 4 is sufficiently lowered or the injection temperature of the polyurethane material M is raised, because the depression of the boiling point of water takes place in the evacuated cavity, as explained earlier. In that case, water vapor augments the expansion of the core part 44 which is due to chemical foaming.

The outer part of the polyurethane material M forms the slightly expanded skin layer 45, as shown in FIG. 13, in the same manner as in the first example. The skin layer 45 has almost invisible minute foams; therefore, the steering wheel covering 43, molded in this manner has the same good appearance as that which is formed with a low-boiling solvent such as freon in the conventional manner.

Thus, the polyurethane material M increases in volume and flows in the cavity 4 as it forms the steering wheel covering 43 consisting of the highly expanded core 44 and the slightly expanded skin layer 45, until it reaches the final fill position L, as shown in FIG. 6. Usually, the flow takes 8–20 seconds, from injection to complete filling. During this flow time, the vent hole 5 is kept closed by the plug 18. As the polyurethane material M flows in the cavity 4, it gradually seals the gap between the mating mold surfaces 2a and 3a. Therefore, pressure in the cavity 4 increases spontaneously with the flow of the polyurethane material M. This prevents the carbon dioxide gas evolved from infinitely expanding to give rise to coarse cells. As the result, the core 44 has a uniform expansion ratio throughout its periphery. This leads to a uniform quality.

Figure 7:
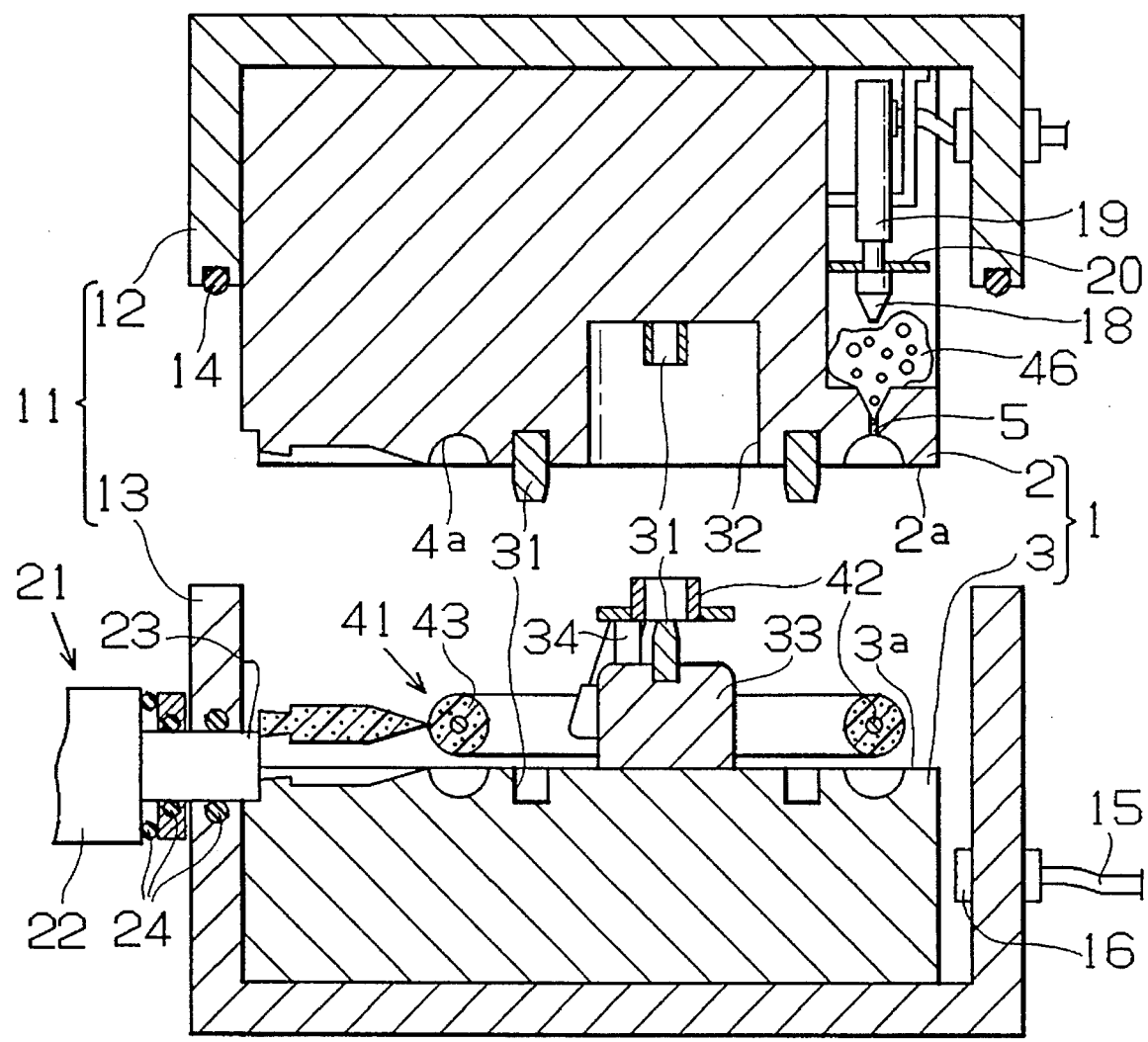
FIG. 7 is a sectional view showing the steering wheel being demolded, with the mold opened.

(5) When the polyurethane material M has reached the final fill position in the cavity 4, the vent hole 5 is opened automatically by the above-mentioned control mechanism, so that the fore-end of the polyurethane material M is discharged from the cavity 4 through the vent hole 5. (The discharged part 46 is indicated in FIG. 7 which shows the subsequent step.) Usually, the fore-end of the polyurethane material M tends to collect gas which causes pinholes, voids, and short shot. This problem is completely solved in this example because the fore-end is discharged.

(6) When the polyurethane material M in the cavity 4 has cured, the stationary mold 2 and movable mold 3 of the mold 1 are opened and, at the same time, the upper casing 12 and lower casing 13 are separated to open the vacuum box 11, as shown in FIG. 7. Curing usually takes 100–180 seconds. In this example, the molded steering wheel 41 is demolded by the ejector pin 34 which is interlocked with the movable mold 3. One cycle of the molding operation is completed by removing the discharged part 46 of the polyurethane material M.

The molding of the steering wheel covering 43 presents the following problems (a) and (b) which are characteristic of molding the steering wheel, in addition to the above-mentioned problems associated with using freon. However, these problems are solved when molding is carried out according to this invention. It follows therefore that the method of this invention is suitable for molding the steering wheel covering.

(a) Since the covering 43 of the steering wheel 41 is formed around the core 42, the polyurethane material M injected into the cavity 4 experiences turbulence by the core 42. This turbulence involves air which causes pin-holes, voids, and short shot. According to the conventional technology, it is necessary to make the gate 8 at a position where there is the least possibility of turbulence occurring, and such a position is limited. Moreover, in case turbulence occurs, a remedy for it is necessary. In the present invention turbulence is less liable to occur because the polyurethane material M contains a lower amount of blowing agent and pressure in the cavity 4 increases as the polyurethane material 4 flows in the cavity 4. This permits a wide selection of gate locations and reduces the amount of the fore-end of the polyurethane material to be discharged.

(b) In the molding of the covering 43 of the steering wheel 41, the polyurethane material M injected into the cavity 4 flows in two directions, and the two flows join at the final fill position L, as mentioned above. The confluence tends to form a weld line and collect gas which causes pinholes, voids, and short shot. These problems are completely solved in this example because the cavity 4 is evacuated and the fore-end of the flow (confluence) is discharged.

Example 3

In order to evaluate the usefulness of the molding method and molding apparatus used in this example, polyurethane materials of different formulation were tested for flow in the cavity 4 at different pressures under the following conditions.

(a) Formulation of polyurethane material M (Index of 110, with water taken into consideration)
  Polyol component : 100 parts by weight composed of:
    difunctional polyether polyol (4000): 42 pbw
    trifunctional polyether polyol (5100): 42 pbw
    diethylene glycol (106): 16 pbw
  Amine catalyst: 2 parts by weight
  Paste pigment : 5 parts by weight
  Water as blowing agent: 0.1–0.6 part by weight
  Isocyanate component: 55 parts by weight (b) Temperature at which polyurethane material M is injected: 35° C.

(c) Time which polyurethane material M takes for injection: 3.5 sec (d) Amount of polyurethane material M injected: 290 g (e) Cavity length of mold 1: 1100 mm (f) Temperature of mold 1: 60° C.

The results of the flow test are shown below.

(1) Test with 0.1 part by weight of water for 100 parts by weight of polyol component.

Figure 8:
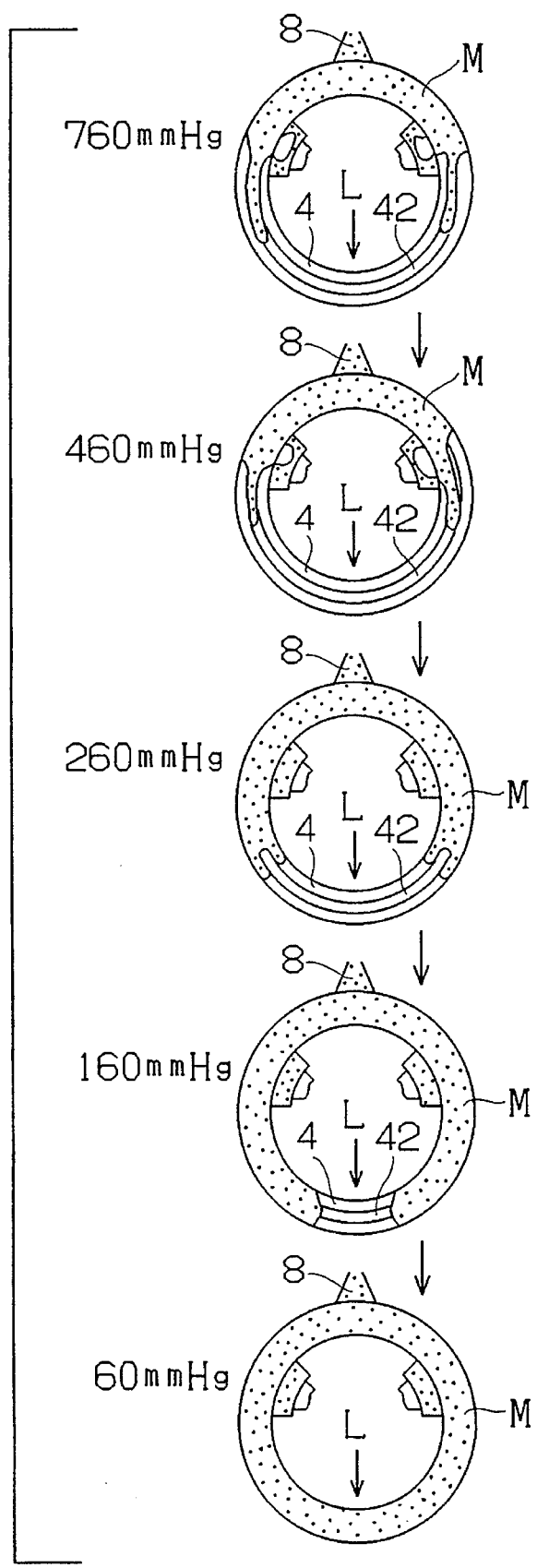
FIG. 8 is a schematic representation showing how the polyurethane material containing 0.1 parts by weight of water flows in the cavity under different pressures.

The flow patterns of the polyurethane material M at different pressures are shown in FIG. 8, and measured values are shown in Table 1. It is noted that when the pressure in the cavity 4 is 760–160 mmHg, the polyurethane material M does not expand sufficiently but gives rise to short shot. When the pressure in the cavity 4 is 160 mmHg, it would be possible to eliminate the short shot (which is small) by increasing the amount of the polyurethane material to be injected. When the pressure in the cavity 4 is 60 mmHg, the covering 43 is free of defects, with the soft core fully expanded and the smooth skin layer hardly expanded.

TABLE 1

| Cavity pressure (mmHg) | Flow state | Length of short shot (mm) | Amount discharged from vent hole (g) |
| --- | --- | --- | --- |
| 760 | short shot | 840 | 0 |
| 460 | short shot | 840 | 0 |
| 260 | short shot | 540 | 0 |
| 160 | short shot | 130 | 0 |
| 60 | filled | 0 | 1.9 |

(2) Test with 0.15 part by weight of water for 100 parts by weight of polyol component.

Figure 9:
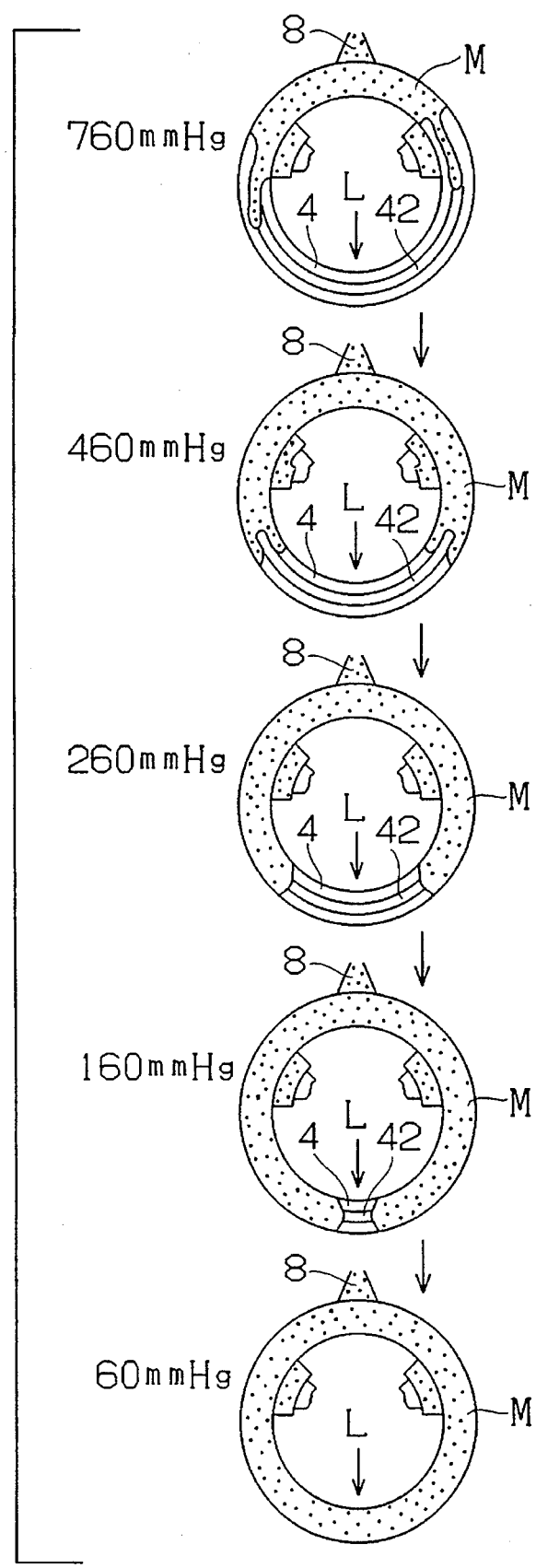
FIG. 9 is a schematic representation showing how the polyurethane material containing 0.15 parts by weight of water flows in the cavity under different pressures.

The flow patterns of the polyurethane material M at different pressures are shown in FIG. 9, and measured values are shown in Table 2. The results are similar to those in (1); however, the short shot is smaller at pressures of 760–160 mmHg.

TABLE 2

| Cavity pressure (mmHg) | Flow state | Length of short shot (mm) | Amount discharged from vent hole (g) |
| --- | --- | --- | --- |
| 760 | short shot | 740 | 0 |
| 460 | short shot | 570 | 0 |
| 260 | short shot | 260 | 0 |
| 160 | short shot | 45 | 0 |
| 60 | filled | 0 | 10.8 |

Figure 10:
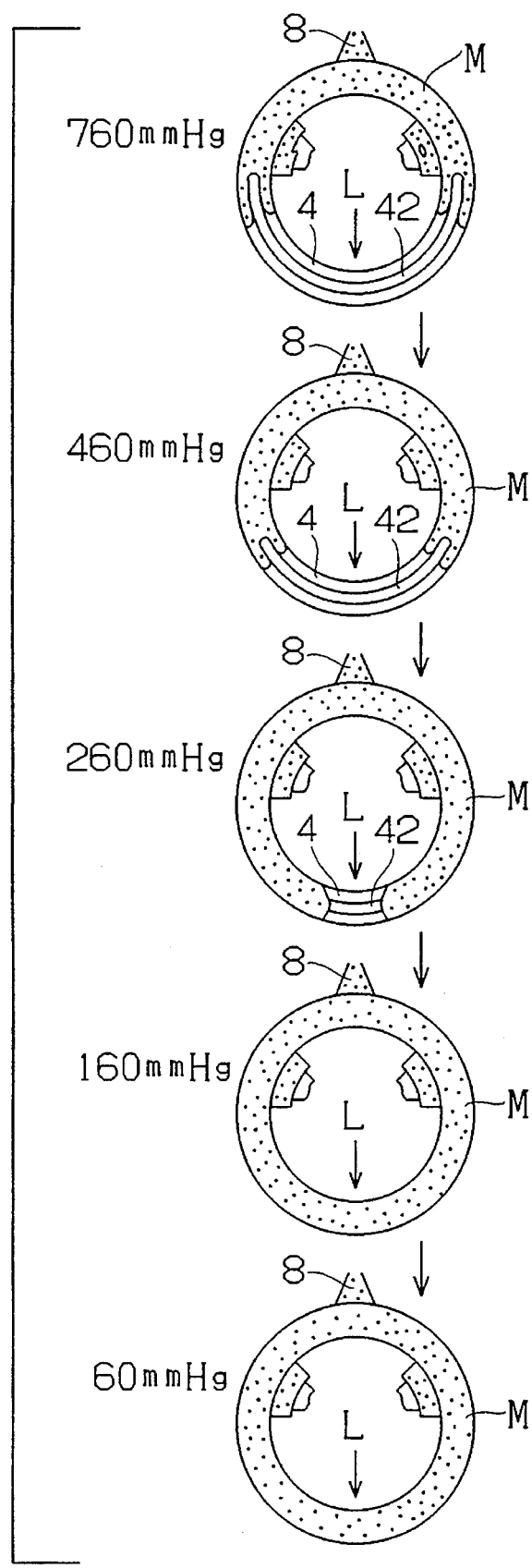
FIG. 10 is a schematic representation showing how the polyurethane material containing 0.25 parts by weight of water flows in the cavity under different pressures.

(3) Test with 0.25 part by weight of water for 100 parts by weight of polyol component. The flow patterns of the polyurethane material M at different pressures are shown in FIG. 10, and measured values are shown in Table 3. The short shot is much smaller at pressures of 760–260 mmHg. The complete filling of the cavity 4 (without discharging) is achieved at a pressure of 160 mmHg and below.

TABLE 3

| Cavity pressure (mmHg) | Flow state | Length of short shot (mm) | Amount discharged from vent hole (g) |
| --- | --- | --- | --- |
| 760 | short shot | 650 | 0 |
| 460 | short shot | 340 | 0 |
| 260 | short shot | 80 | 0 |
| 160 | filled | 0 | 0 |
| 60 | filled | 0 | 10.0 |

(4) Test with 0.4 part by weight of water for 100 parts by weight of polyol component.

Figure 11:
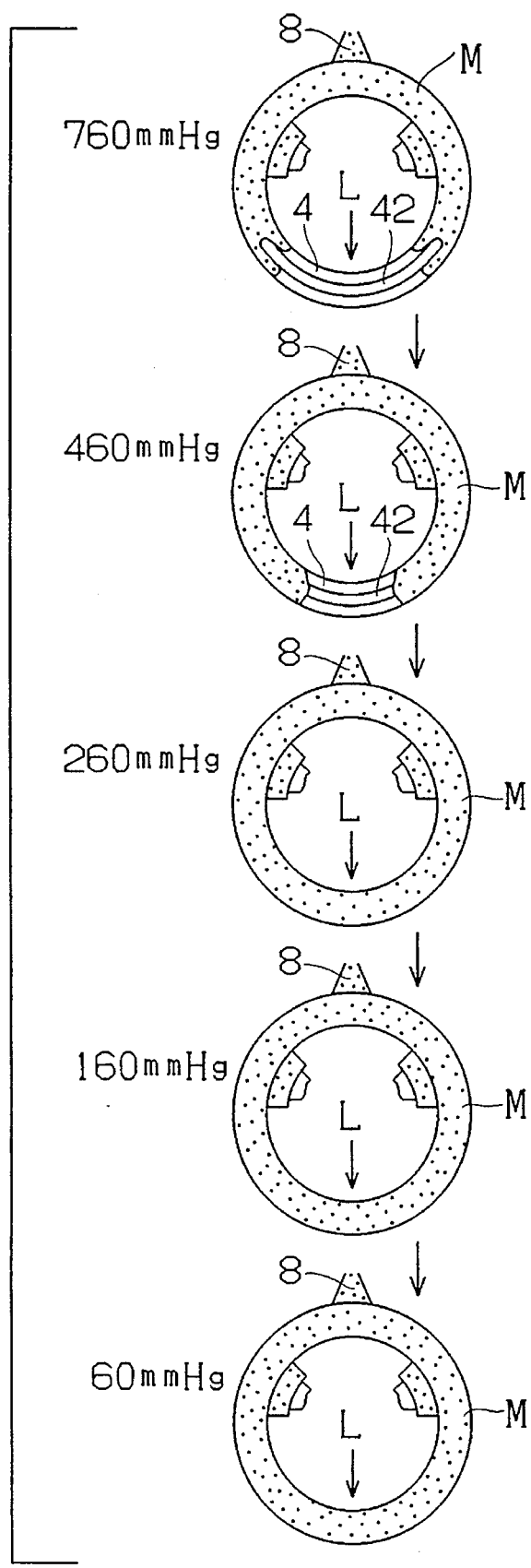
FIG. 11 is a schematic representation showing how the polyurethane material containing 0.4 parts by weight of water flows in the cavity under different pressures.

The flow patterns of the polyurethane material M at different pressures are shown in FIG. 11, and measured values are shown in Table 4. The short shot is much smaller at pressures of 760–460 mmHg. The complete filling of the cavity 4 is achieved at a pressure of 260 mmHg and below.

TABLE 4

| Cavity pressure (mmHg) | Flow state | Length of short shot (mm) | Amount discharged from vent hole (g) |
| --- | --- | --- | --- |
| 760 | short shot | 290 | 0 |
| 460 | short shot | 150 | 0 |
| 260 | filled | 0 | 1.0 |
| 160 | filled | 0 | 10.1 |
| 60 | filled | 0 | 22.3 |

(5) Test with 0.6 part by weight of water for 100 parts by weight of polyol component.

Figure 12:
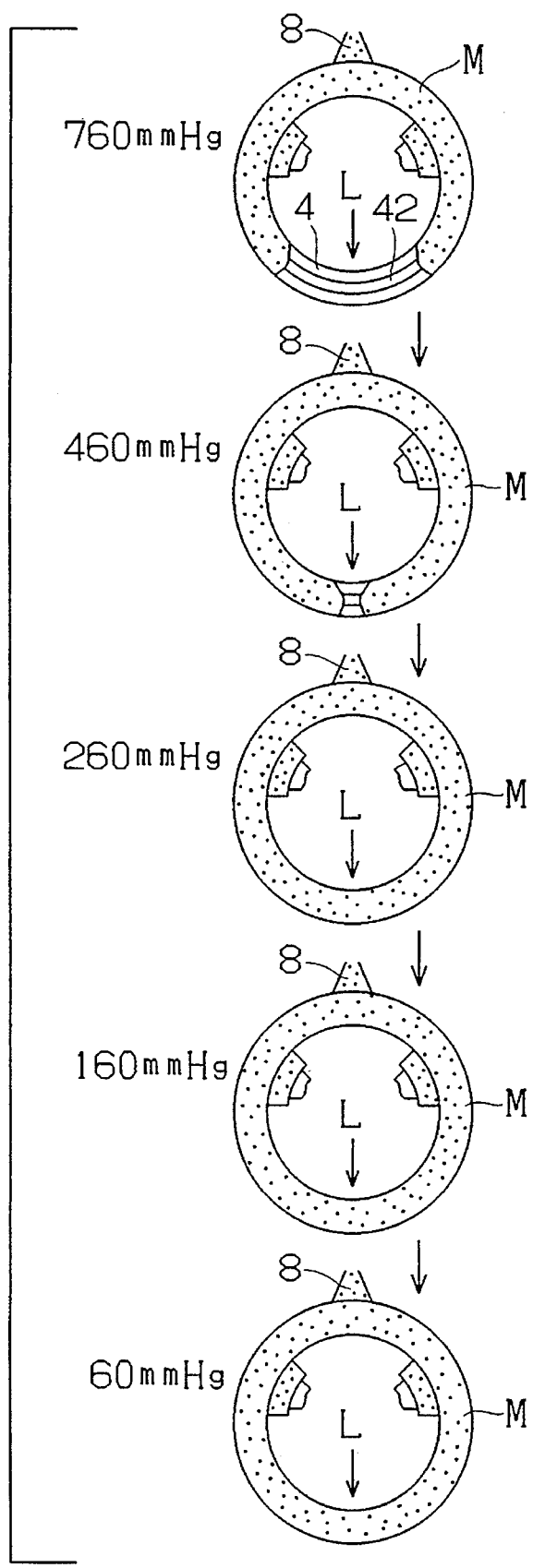
FIG. 12 is a schematic representation showing how the polyurethane material containing 0.6 parts by weight of water flows in the cavity under different pressures.

The flow patterns of the polyurethane material M at different pressures are shown in FIG. 12, and measured values are shown in Table 5. The results are similar to those in (4); however, the short shot is much smaller at pressures of 760–460 mmHg.

TABLE 5

| Cavity pressure (mmHg) | Flow state | Length of short shot (mm) | Amount discharged from vent hole (g) |
| --- | --- | --- | --- |
| 760 | short shot | 230 | 0 |
| 460 | short shot | 10 | 0 |
| 260 | filled | 0 | 5.8 |
| 160 | filled | 0 | 13.3 |
| 60 | filled | 0 | 19.1 |

The results of the above-mentioned flow test indicate that (1) it is possible for the covering 43 to have a sufficient extent of foaming even though the amount of water is as small as 0.1 part by weight, if the cavity pressure is reduced to about 60 mmHg, and (2) it is possible for the covering 43 to have a sufficient extent of foaming even though the cavity pressure is only slightly reduced to 300–400 mmHg, if the amount of water is 0.6 part by weight. Samples of the covering 43 obtained in the above-mentioned flow test at the cavity pressure of 60 mmHg (with the amount of water varied) were evaluated by testing the core part for tensile properties (tensile strength and elongation) and hardness. Hardness was measured using a hardness meter conforming to JIS Type A, at room temperature. The results are shown in Table 6. It is noted from Table 6 that (1) all the samples are flexible due to sufficient foaming and (2) all the samples are not hard nor brittle despite the small amount of water used.

TABLE 6

| Amount of water (pbw) | Tensile strength (kg/cm$^2$) | Elongation (%) | Hardness |
| --- | --- | --- | --- |
| 0.1 | 28.0 | 100 | 76 |
| 0.15 | 32.2 | 100 | 78 |
| 0.25 | 35.0 | 115 | 74 |
| 0.4 | 31.2 | 120 | 72 |
| 0.6 | 31.0 | 120 | 63 |

While preferred embodiments have been described, variations thereto will occur to those skilled in the art within the scope of the invention as illustrated in the following.

(1) Although the first embodiment employs the mold 1 and the vacuum box 11 which are separate, another embodiment would be possible which employs a mold of double-wall structure, with the outer wall functioning as the vacuum box 11 and the two walls forming the space.

Figure 14:
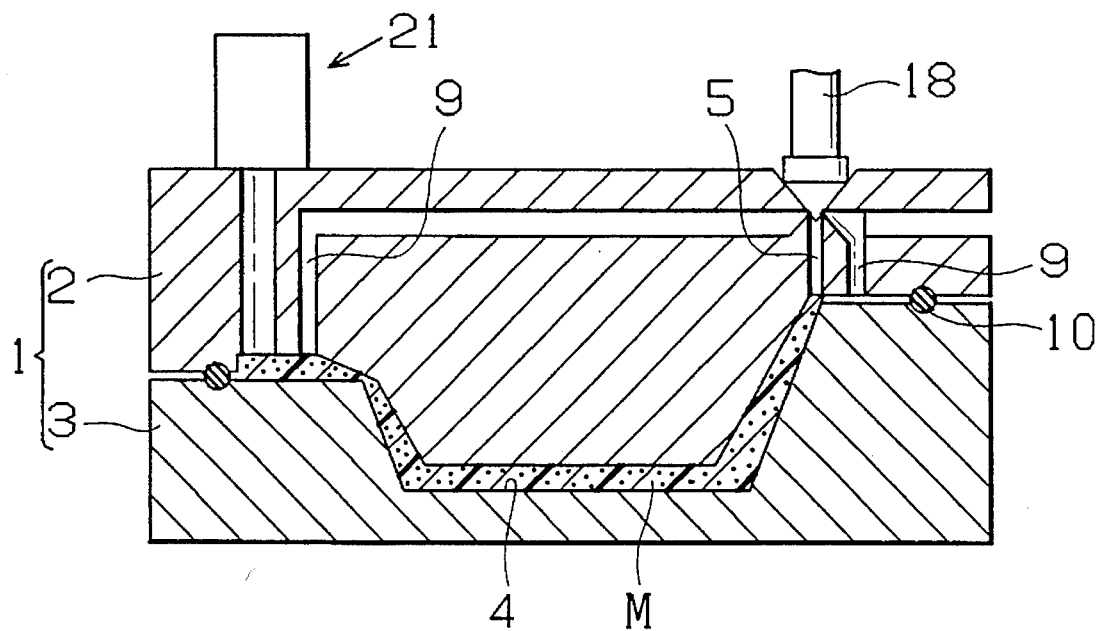
FIG. 14 is a sectional view showing an example of the modified mold.

(2) The cavity 4 may be provided with a large groove 9 along its entire or partial periphery through which the cavity 4 is evacuated (see FIG. 14). The groove 9 would function as the space K. The groove 9 may be formed in either or both of the stationary mold 2 and movable mold 3. Moreover, the periphery of the groove may be provided with a seal member 10 to isolate the cavity from the atmosphere.

(3) The effect of the present invention is not produced if only the cavity of the ordinary mold is evacuated in the atmosphere. This is because it is difficult to completely seal the mating mold surfaces owing to the limited machining precision. Therefore, the cavity is not fully evacuated when the polyurethane material is injected into the cavity. Moreover, with an evacuated mold in direct contact with the atmosphere, it is hard to discharge the excess gas (which is evolved by the polyurethane material after the start of foaming) from the cavity.

(4) The apparatus in the above-mentioned example has the vent hole 5. However, the vent hole 5 would be unnecessary if the mold has a porous part at the final fill position so that gas escapes through the pores.

(5) The mold may be made of ceramics, plastics, or any other material which withstands the foaming pressure.

EFFECTS OF THE INVENTION

Being constructed as mentioned above, the present invention produces the following effects.

The molding method as defined in the first embodiment obviates the use of low-boiling solvents such as freon and methylene chloride which pose problems when used as a blowing agent. Nevertheless, it permits the production of a polyurethane foam having the same good appearance and soft feeling as one produced with a low-boiling solvent.

The molding method as defined in the second embodiment gives rise to a polyurethane foam having a higher extent of foaming than in the case of the first molding method.

The molding method as defined in the third embodiment gives rise to a polyurethane foam in which the core part has a uniform extent of foaming and hence has a uniform quality. This polyurethane foam is free of pinholes, voids, and short shot.

The molding method as defined in the fourth embodiment gives rise to a polyurethane foam having a high extent of foaming. This polyurethane foam is free of pinholes, voids, and short shot, as in the case of the third molding method.

The molding apparatus as defined in the fifth embodiment facilitates the practice of the above-mentioned four molding methods.

The molding apparatus as defined in the sixth embodiment permits the cavity pressure to be reduced easily and keeps the evacuated cavity isolated from the atmosphere. The apparatus provides a space between the mold and the vacuum box which functions as a buffer for evacuation.

The molding apparatus as defined in the seventh embodiment is simpler and smaller than the sixth apparatus. It permits the reduction of time for evacuation.

The molding apparatus as defined in the eighth embodiment has a venting mechanism which is simple and yet works surely.

The molding apparatus as defined in the ninth embodiment facilitates the practicing of the third molding method.

What is claimed is:

1. A method for producing a polyurethane foam molded article, wherein said polyurethane foam molded article has a core of low density and a skin layer of high density, comprising the steps of:
   (a) lowering the pressure in a mold cavity to a pressure of 400 mm Hg or less;
   (b) subsequently injecting a polyurethane material into the mold cavity having a pressure of 400 mm Hg or less; and then
   (c) expanding the polyurethane material so that it flows and fills the mold cavity;
   wherein the polyurethane material comprises an isocyanate compound, 100 parts by weight of polyol component and 0.1–0.6 parts by weight of water as a blowing agent.

2. A method for molding a polyurethane foam as claimed in claim 1, which further comprises introducing minute air bubbles into the polyurethane material before its injection into the cavity.

3. A method according to claim 1 which further comprises:
   (d) increasing the pressure in the mold cavity spontaneously as the polyurethane material flows; and
   (e) discharging from the mold cavity the fore-end of the flow of the polyurethane material which goes beyond a final fill position, when the flowing polyurethane material has reached the final fill position in the mold cavity.

4. A method according to claim 1 which further comprises the steps:
   (d) keeping the pressure low in the mold cavity while the polyurethane material is flowing; and
   (e) discharging from the mold cavity the fore-end of the flow of the polyurethane material which goes beyond a final fill position, when the flowing polyurethane material has reached the final fill position.

5. A method according to claim 1, wherein the pressure in the mold cavity is 60 mm Hg or less.

6. A method according to claim 1, wherein the amount of water present as a blowing agent is in the range 0.25 to 0.6 parts by weight, and the pressure in the mold cavity is 160 mm Hg or less.

7. A method according to claim 1, wherein the amount of water present as a blowing agent is in the range 0.4 to 0.6 parts by weight, and the pressure in the mold cavity is 260 mm Hg or less.

8. A method according to claim 1, wherein the isocyanate compound is present in the polyurethane composition in an amount corresponding to an index of 110.

9. A method according to claim 1, wherein the the isocyanate compound is present in an amount of 55 parts by weight relative to 100 parts by weight of the polyol component.

10. A method according to claim 1, wherein the pressure in the mold cavity is maintained at 400 mm Hg or less after the polyurethane material is injected.

* * * * *